United States Patent [19]
Birzer

[11] Patent Number: 6,151,650
[45] Date of Patent: Nov. 21, 2000

[54] CENTRAL PROCESSING UNIT OF A MODULAR PROGRAMMABLE CONTROLLER

[75] Inventor: Johannes Birzer, Stulln, Germany

[73] Assignee: Siemens Aktiengesellschaft, Munich, Germany

[21] Appl. No.: 08/419,166

[22] Filed: Apr. 10, 1995

[30] Foreign Application Priority Data

Apr. 13, 1994 [EP] European Pat. Off. .............. 94105722

[51] Int. Cl.⁷ ...................................................... G06F 9/06
[52] U.S. Cl. ........................................... 710/129; 709/250
[58] Field of Search ................................... 395/309, 308, 395/200.16, 146; 364/140

[56] References Cited

U.S. PATENT DOCUMENTS

| | | | |
|---|---|---|---|
| 5,225,974 | 7/1993 | Mathews et al. ........................ | 364/140 |
| 5,245,704 | 9/1993 | Weber et al. ............................ | 395/200 |
| 5,349,679 | 9/1994 | Nakayama ............................... | 395/800 |
| 5,485,590 | 1/1996 | Hyatt et al. .............................. | 395/442 |

FOREIGN PATENT DOCUMENTS

| | | |
|---|---|---|
| 0 540 903 | 5/1993 | European Pat. Off. . |
| 38 08 135 | 9/1989 | Germany . |
| 41 35 749 | 5/1992 | Germany . |
| 9114988 | 10/1991 | WIPO . |

OTHER PUBLICATIONS

Patent Abstracts of Japan, vol. 18, No. 218 Apr. 19, 1994 & JP–A–06 014 378 (Matsushita Electric Works Ltd.) Jan. 21, 1994.

*Primary Examiner*—Paul R. Myers
*Attorney, Agent, or Firm*—Kenyon & Kenyon

[57] ABSTRACT

The central processing unit of a modular programmable controller has a programming interface with bus capability, as well as a communication interface to peripheral units. The programming interface and the communication interface are interconnected, allowing the peripheral units to communicate with external units quickly and efficiently.

4 Claims, 4 Drawing Sheets

CENTRAL PROCESSING UNIT OF A MODULAR PROGRAMMABLE CONTROLLER

BACKGROUND OF THE INVENTION

The present invention relates to a central processing unit of a modular programmable controller with a communications interface. The central processing unit includes a processor unit, a memory device, a peripheral interface, and a programming interface, all interconnected with a bus system.

In the case of a central processing unit of a modular programmable controller, the programming interface is designed as a point-to-point interface, so that a programming unit, e.g., a programming terminal or a PC, can be connected via an interface cable to the central processing unit. To network the central processing units of a plurality of controllers of this type, modular programmable controllers have their own communication modules with two interfaces. The one interface can be coupled via an interconnecting cable to the programming interface of the central processing unit. The other interface has bus capability, so that the communication module is connectable to a bus, e.g., to the SINEC H1 or to the SINEC L2.

There are several disadvantages entailed by this configuration. First, space is needed for the communication module. Also, the communication module is often more expensive than the central processing unit itself. In addition, the communication between the communication module and the central processing unit is interference-prone and slow. Data transfer rates of up to 1.5 MBaud (SINEC L2) or of up to 10 MBaud (SINEC H1), for example, can be realized over the bus, while the data transfer rate over the interconnecting cable merely amounts to 9.6 kBaud.

EP-A-0 540 903 discloses a control module having a network interface. The application program, inter alia, can be loaded via the network interface into the control module.

A programmable controller having an interface with bus capability is known from the WO-A-91 14988. However, this interface is not used as a programming interface.

Modular programmable controllers consist not only of the central processing unit, but also of at least one peripheral unit, mostly of a plurality of peripheral units. In particular, when the peripheral units are designed as intelligent peripheral units, it may be desirable to have the peripheral units communicate with other units outside of the programmable controller.

SUMMARY OF THE INVENTION

The object of the present invention is to provide the above described functionality in a way that is efficient, cost-effective, compact, reliable, and fast.

This objective is achieved in accordance with the present invention wherein the central processing unit can be connected to at least one peripheral unit through a communication interface. Further, the programming interface is linked to the communication interface. In this manner, the peripheral unit can be accessed directly from the outside via the programming interface or, through the programming interface, the peripheral unit can directly access units connected to the modular programmable controller.

When the programming interface is detachably coupled to the communication interface, the communication via the bus connected to the programming interface and via a bus connected to the communication interface can be carried out independently of one another.

The processor unit can be directly coupled to the programming interface or via an intelligent intermediate unit. When the connection is via an intelligent intermediate unit, the processor unit is relieved of the task of managing the programming interface. The intelligent intermediate unit can be optionally designed as a software-controlled microprocessor or as a microcontroller realized as hardware. When the processor unit is coupled to the programming interface directly or via a microprocessor, data transfer rates of close to 200 kBaud can be realized. When the intelligent intermediate unit is designed as a microcontroller, data transfer rates of up to 12 MBaud can be realized.

When the programming interface is designed as a serial interface with differential signal transmission, e.g. as an RS 485 interface, the signal transmission is especially fault-tolerant.

DETAILED DESCRIPTION

Figure 1:
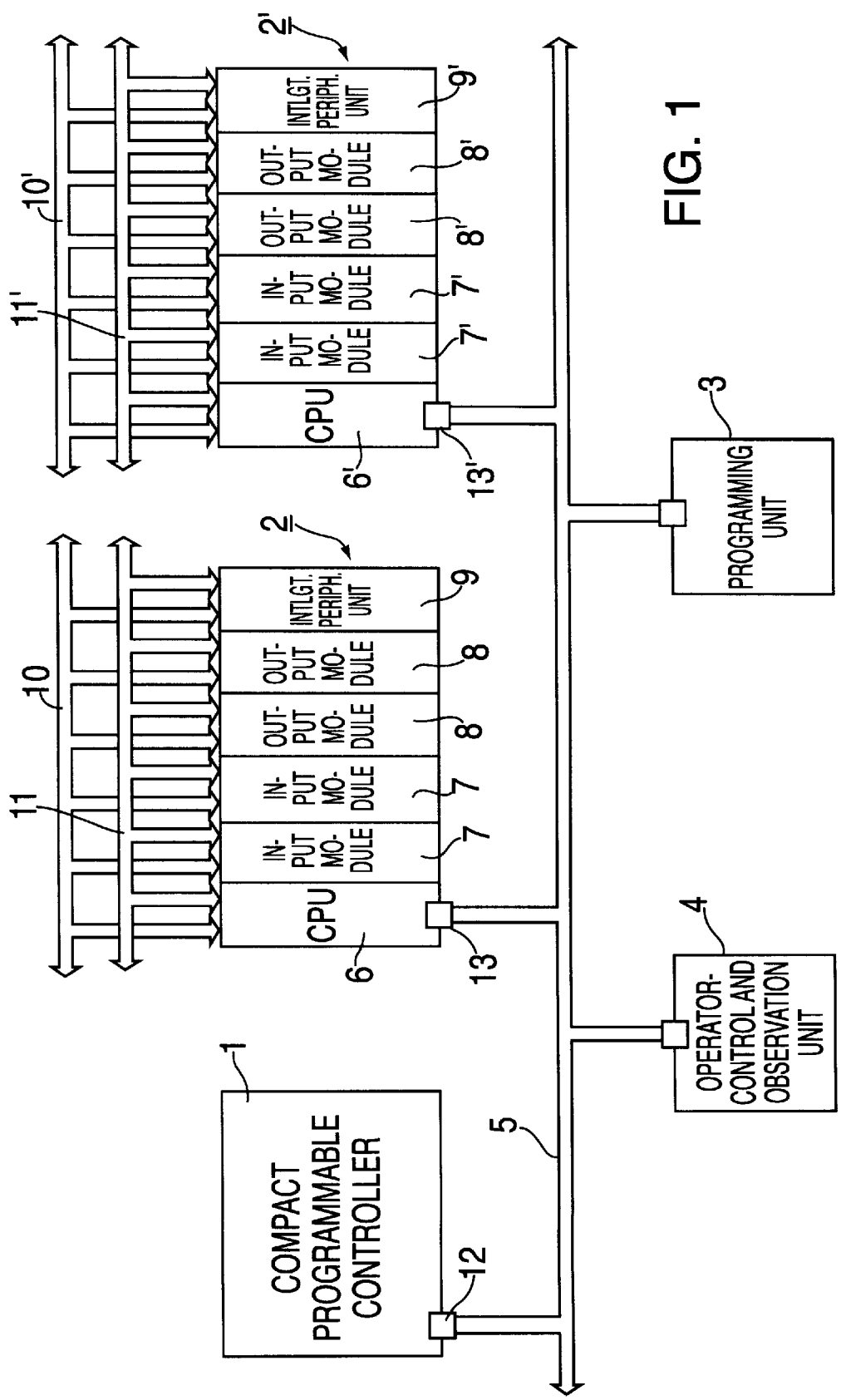
FIG. 1 shows a plurality of programmable controllers that are networked with one another.

In accordance with FIG. 1, a compact programmable controller 1 ("compact unit"), modular programmable controllers 2, 2', a programming unit 3, as well as an operator-control and observation unit 4 are networked with one another via a bus 5. The programmable controllers 1, 2, 2' are coupled in this case via the programming interfaces 12, 13, 13' to the bus 5.

Up to 15 terminals 1–4, 2' can be connected to the bus 5. The terminals 1–4, 2' are distinguished from one another by the assignment of addresses.

The modular programmable controllers 2, 2' have one central processing unit 6, 6' each, input modules 7, 7',output modules 8, 8',as welt as intelligent peripheral units 9, 9'. The inputs 6 through 9 or 6' through 9' are interconnected via the buses 10, 11 or the buses 10' 11'. The buses 10, 10' are control buses, which are used to manage real-time communications; the buses 11, 11' serve to transmit communications which are not timecritical. The connection of the modules 7–9, 7'–9' with the buses 11, 11' is optional in this case.

The compact unit 1 can be a SIMATIC S5-95U, for example; the modular programmable controllers can be SIMATICs S5-115U, for example. The programming unit 3 is preferably designed as a programming unit or as a PC. The bus 5 is preferably a serial bus, on which differential signals are transmitted, e.g. a SINEC L2.

Figure 2:
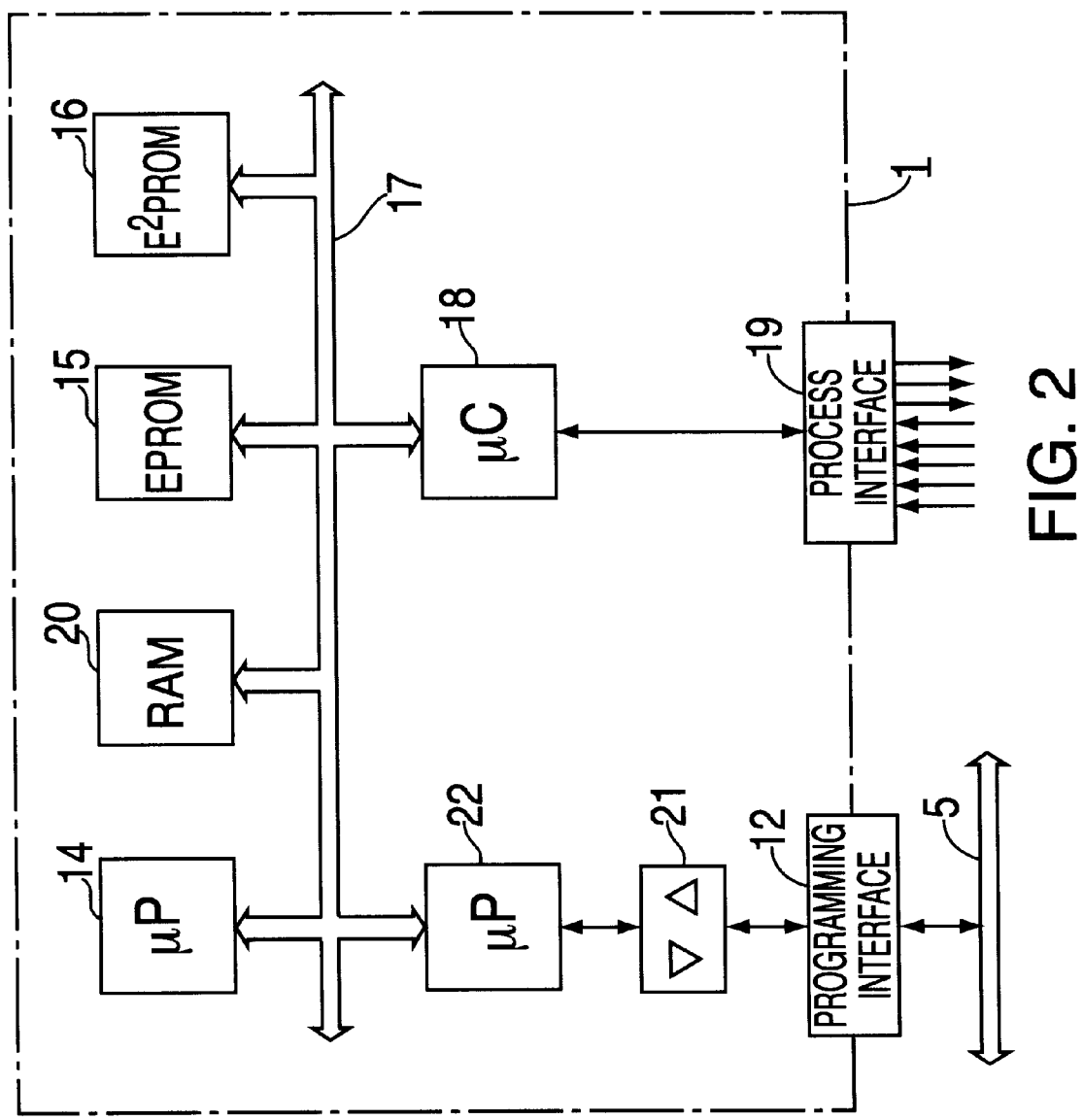
FIG. 2 shows the design layout of a compact programmable controller.

In accordance with FIG. 2, the compact unit 1 has a processor unit 14, for example a microprocessor 14, which executes an application program stored in the memory device 16 with the help of the operating system stored in the memory device 15. To this end, via the bus 17 and the microcontroller 18, the processor 14 accesses the process interface 19, to which are connected process-sensor elements (not shown), e.g.,temperature sensors. From there, it inputs input signals and stores them in the memory device 20. From these input signals, the processor unit 14 then determines output signals, likewise deposits them in the memory device 20, and then outputs them via the bus 17, the controller 18, the process interface 19 and via the process final control elements (likewise not shown), e.g.,heating elements, which are connected to the process interface, to the technical process to be controlled. The technical process to be controlled can be of any sort whatsoever, e.g.,the controlling of a burner or a press.

The memory devices 15, 16, 20 can be designed in several ways. As a rule, however, the memory device 15 is an EPROM or an EEPROM, the memory device 16 an EEPROM or a flash EPROM, the memory device 20 a buffered or unbuffered RAM.

To be able to write the application program into the memory device 16, the compact unit 1 has a programming interface 12, which is linked via driver blocks 21 and an intelligent intermediate unit 22 to the bus 17. In the present case, the driver blocks 21 are differential amplifiers, so that the programming interface 12 is designed as an RS 485 interface. In this instance, the intelligent intermediate unit 22 is designed as a microprocessor, which is controlled by an internally stored program. This microprocessor 22 enables data transfer rates of up to 187.5 kBaud to be realized via the programming interface 12. The intelligent intermediate unit 22 could, however, also be designed as a microcontroller or be eliminated. In the latter case, the driver blocks 21 would be directly linked to the processor unit 14.

Because it is designed as an RS 485 interface, the programming interface 12 is not only very fault-tolerant, but it also has bus capability. Thus, at the same time, a plurality of other terminals can be linked to the programming interface 12. Thus, no further interface is needed to network the compact unit 1 with other programmable controllers.

Figure 3:
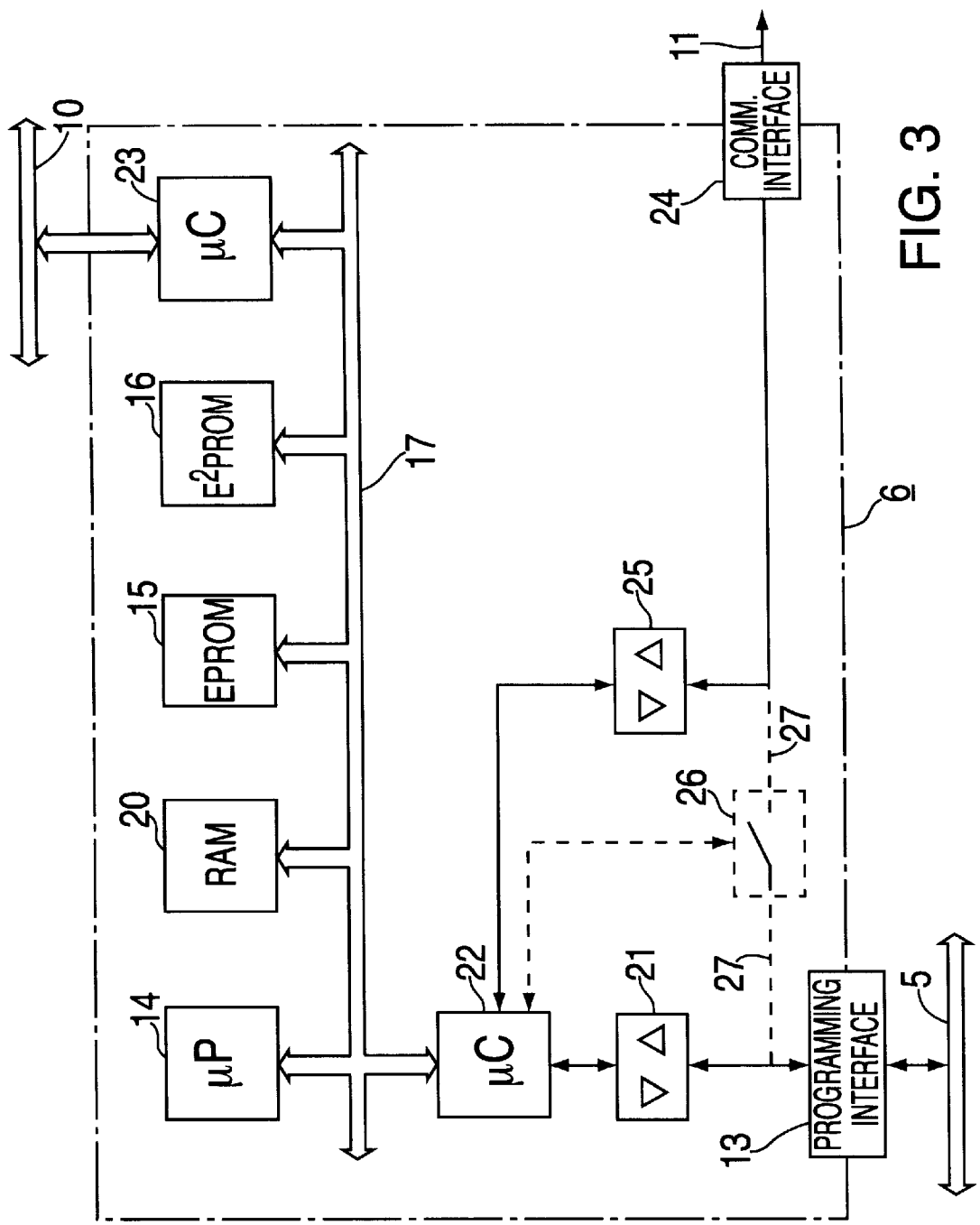
FIGS. 3 and 4 show the design layout of the central processing unit of a modular programmable controller.

The central processing unit 6 of the programmable controller 2 depicted in FIG. 3 is—in the same way as the central processing unit 6'—essentially similar in construction to the compact unit 1. The method of functioning is also essentially the same. To the extent that the same reference numerals are used in FIG. 3 as are in FIG. 2, the same elements are described. Also, only the distinctions from the compact unit 1 will be delineated in the following.

Since the programmable controller 2 has a modular design, the central processing unit 6, of course, does not have its own process interface. These process interfaces are provided in the peripheral units 7 through 9. The accessing of peripheral units takes place via the microcontroller 23 acting as a peripheral interface, in combined action with the peripheral bus 10.

In the present case, the intelligent intermediate unit 22 is designed as an application-specific microcontroller 22 (ASIC). Therefore, the intelligent intermediate unit 22 is controlled via hardware. As a result, high data transfer rates of up to 12 MBaud can be realized with this intermediate unit 22.

Besides the microcontroller 23, the central processing unit 6 also has a communication interface 24, to which the communication bus 11 can be connected. This bus 11 is likewise operated via the driver blocks 25 as an RS 485 bus. The driver blocks 25 are again connected to the intelligent intermediate unit 22.

Since differential signals are transmitted both via the bus 5 as well as via the bus 11 in accordance with the RS 485 interface definition, it is possible to couple both buses 5, 11 to one another. This is preferably accomplished by means of the switches 26 drawn in with dotted lines in FIG. 3 and the connecting lines 27. The switches 26 are likewise controlled by the intelligent intermediate unit 22. The switches 26 are designed, for example, as relays, as tristate drivers having blocking ability, or as MOSFETs.

Figure 4:
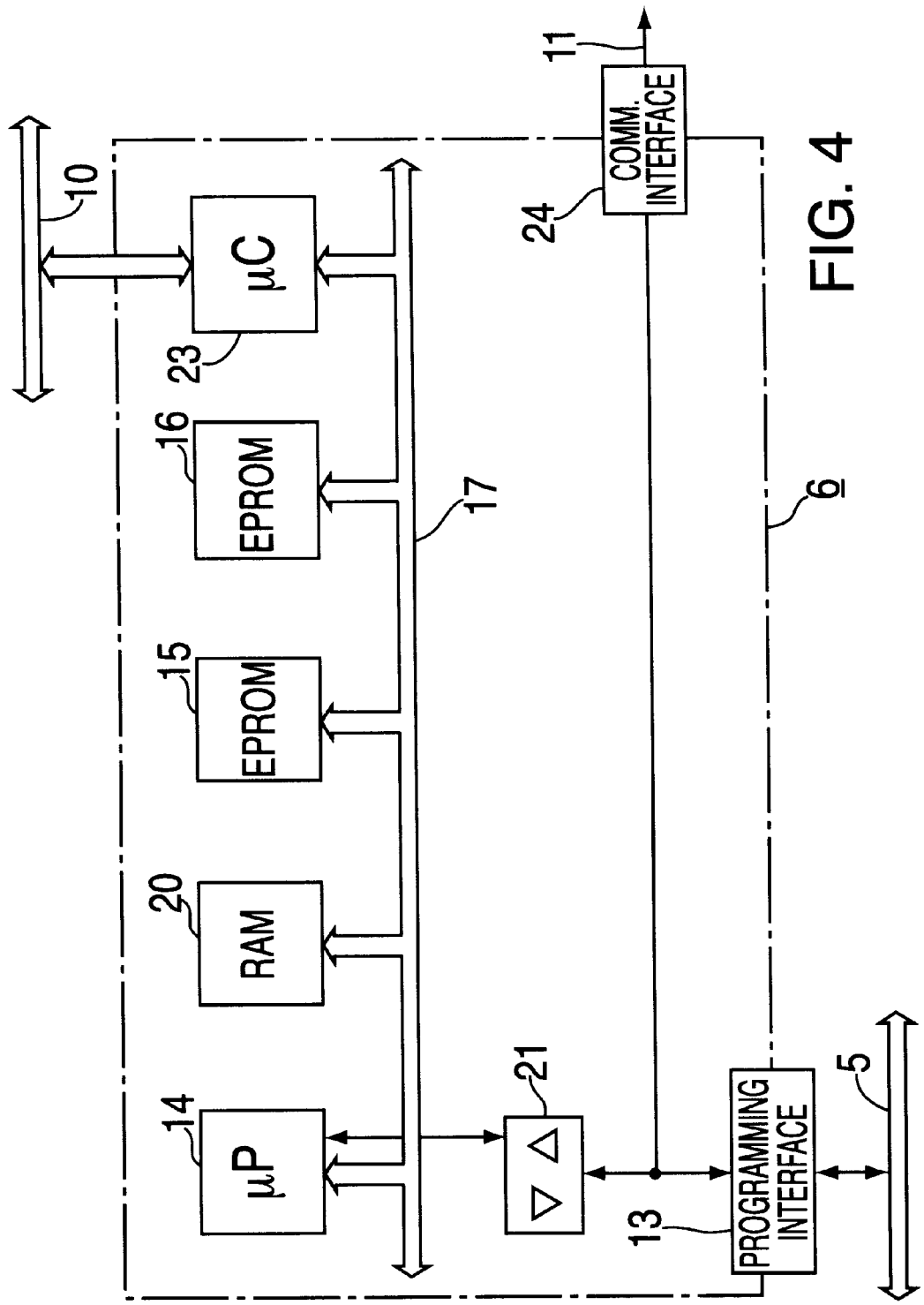

In accordance with FIG. 3, the connection between the programming interface 13 and the communication interface 24 are separable. The connection can also be permanent, however, as shown in FIG. 4. In this case, of course, we can do without the second set of driver blocks 25. FIG. 4 also illustrates that the driver blocks 21 can be directly connected to the processor unit 14.

When the buses 5 and 11 are interconnected, a direct communication is possible between the peripheral units 7 through 9 connected to the bus 11 and the units, e.g. the programming unit 3, connected to the bus 5. This represents a communication possibility for the peripheral units 7 through 9 that does not require any great technical solutions, since separate bus interfaces are not required for the peripheral units 7 through 9. Since, in addition, a direct communication is possible between the peripheral units 7 through 9 with the units connected to the bus 5, the central processing unit 14 is also not encumbered by this communication.

The programmable controllers 1, 2, 2' are, of course, programmed via the bus 5 and the programming interfaces 12, 13. Moreover, the programable controlers 1, 2, 2' communicate via the programing interfaces 12, 13 and the bus 5, but also among themselves, and with the operator-control and observation unit 4.

What is claimed is:

1. A central processing unit of a modular programmable controller comprising:

a processor for executing an application program;

a memory device for storing at least the application program;

a peripheral interface for connecting at least one peripheral unit to the central processing unit;

a first bus system interconnecting at least the processor, the memory device and the peripheral interface;

a programming interface for linking a programming unit and other devices to the central processing unit and for transmitting communications between the central processing unit and the programming unit and the other devices over a second bus system, wherein serial differential signal transmission is used on the second bus system;

a communications interface coupled to the programming interface, the communications interface coupling the at least one peripheral unit to the central processing unit and transmitting communications between the at least one peripheral unit and the central processing unit and the programming unit and the other devices over a third bus system, wherein a serial differential signal transmission is used on the third bus system, whereby the second bus system can be coupled to the third bus system.

2. The central processing unit according to claim 1, wherein the programming interface is detachably coupled to the communication interface.

3. The central processing unit according to claim 1, further comprising an intelligent intermediate unit coupling the processor to the programming interface.

4. The central processing unit according to claim 2, further comprising an intelligent intermediate unit coupling the processor to the programming interface.

* * * * *